(No Model.)

J. A. JOHUM.
MECHANICAL MOVEMENT.

No. 258,653.  Patented May 30, 1882.

Witnesses:
Jol. N. Rosenbaum
Otto Risch

Inventor
Joseph A. Johum
by Paul Goepel
Attorney

UNITED STATES PATENT OFFICE.

JOSEPH A. JOHUM, OF NEW YORK, N. Y.

MECHANICAL MOVEMENT.

SPECIFICATION forming part of Letters Patent No. 258,653, dated May 30, 1882.

Application filed April 29, 1882. (No model.)

*To all whom it may concern:*

Be it known that I, JOSEPH A. JOHUM, of the city, county, and State of New York, have invented certain new and useful Improvements in Mechanical Movements for Sewing-Machines, &c., of which the following is a specification.

This invention has reference to an improved mechanical movement for transferring rotary motion from one shaft to another shaft parallel thereto, the movement being specially adapted for heavy sewing-machines, lathes, &c.; and the invention consists of an elbow-lever that is pivoted at one end to a crank-disk of the primary shaft, at the apex of its angle to the crank-disk of a second shaft, and pivoted at its opposite end to a third crank-disk of an auxiliary shaft, which latter assists the second shaft to pass over its dead-points.

Figure 2:
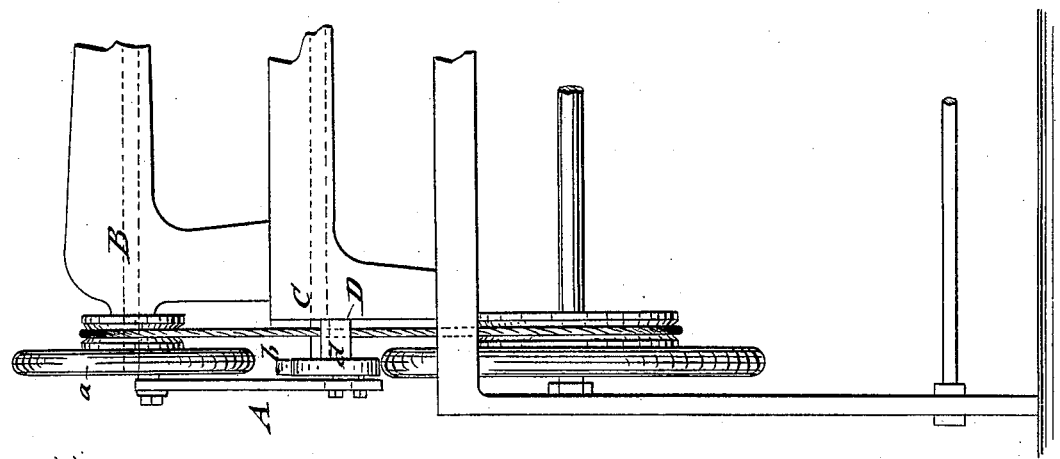
Figure 1:
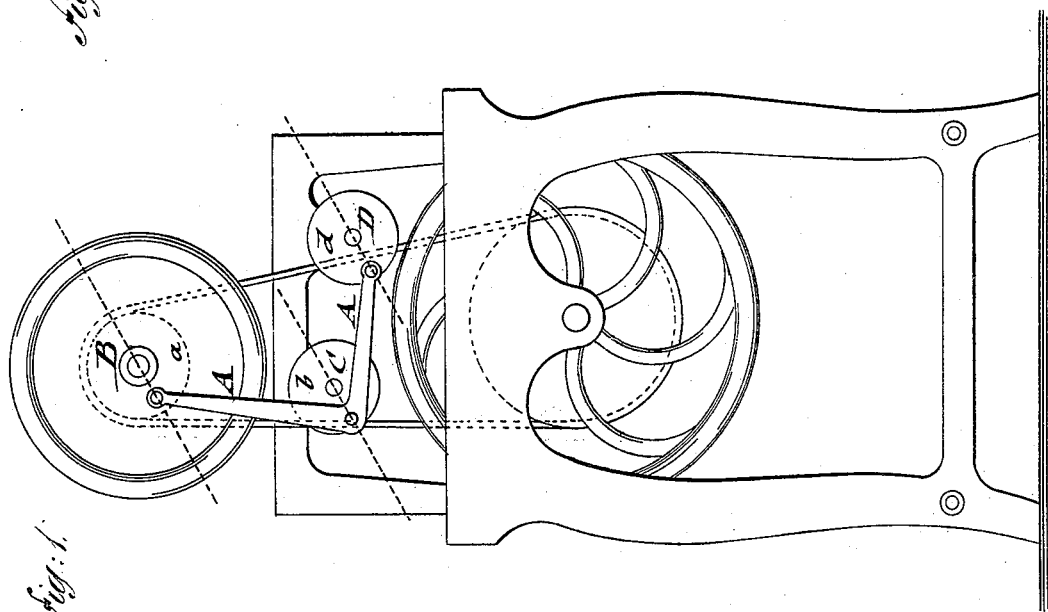

In the accompanying drawings, Figure 1 represents an end elevation of my improved mechanical movement shown as applied to a sewing-machine. Fig. 2 is a front view of the same.

Similar letters of reference indicate the corresponding parts.

A in the drawings represents an elbow-lever, which is pivoted by one arm to the crank-disk $a$ of a primary shaft, B, from which rotary motion is to be imparted to a second shaft, C, parallel thereto. The elbow-lever A is further pivoted at the apex of its angle to a crank-disk, $b$, of the shaft C, and by its opposite end to a crank-disk, $d$, of a third auxiliary shaft, D. The three connecting-pivots of elbow-lever A and crank-disks $a$ $b$ $d$ are arranged equidistant from the centers of the shafts B, C, and D, and in such a manner that, whatever the position of the connecting elbow-lever A and the crank-disks, lines drawn through the pivots of the lever and of the centers of the shafts are parallel to each other, as shown in dotted lines in Fig. 1. The result of this arrangement is that whenever the pivot-connections of the lever A with the shafts B and C arrive at their dead-points, which are located in a vertical line drawn through the centers of the shafts B and C, the pivot-connection of the lever A with the crank-disk $d$ has passed beyond its dead-points, which are located in a horizontal line drawn through the center of the shaft D, so that consequently the auxiliary shaft D and its crank-disk $d$ assist in carrying the crank-disk of the shaft C over its dead-points, whereby the rotary motion of the same is made more regular and uniform and no strain or drag exerted thereby upon the primary shaft B.

Having thus described my invention, I claim as new and desire to secure by Letters Patent—

The combination of a motion-transmitting elbow-lever, A, with crank-disks of a primary shaft, B, an intermediate shaft, C, and an auxiliary shaft, D, to which the elbow-lever is pivoted equidistantly from the centers of the shaft, at its ends, and at the apex of its angle, substantially as and for the purpose set forth.

In testimony that I claim the foregoing as my invention I have signed my name in the presence of two subscribing witnesses.

JOSEPH A. JOHUM.

Witnesses:
PAUL GOEPEL,
SIDNEY MANN.